United States Patent [19]
Choimet et al.

[11] Patent Number: 6,109,770
[45] Date of Patent: Aug. 29, 2000

[54] ILLUMINATING OR LIGHT SIGNALLING DEVICE, PARTICULARLY FOR BICYCLES AND THE LIKE

[75] Inventors: Henri Choimet, Paris, France; Kim Charles, 9 rue Guisarde, 75006 Paris, France

[73] Assignee: Kim Charles, France

[21] Appl. No.: 09/091,357

[22] PCT Filed: Dec. 20, 1996

[86] PCT No.: PCT/FR96/02043

§ 371 Date: Jun. 19, 1998

§ 102(e) Date: Jun. 19, 1998

[87] PCT Pub. No.: WO97/23379

PCT Pub. Date: Jul. 3, 1997

[30] Foreign Application Priority Data

Dec. 21, 1995 [FR] France ................................ 95 15247

[51] Int. Cl.⁷ ............................................ F21W 101/023
[52] U.S. Cl. .................... 362/473; 362/543; 362/253; 362/474; 340/432; 340/427
[58] Field of Search ................... 362/183, 473, 362/474, 543, 545, 251, 234, 253, 475; 340/432, 427, 429

[56] References Cited

U.S. PATENT DOCUMENTS

| | | | |
|---|---|---|---|
| 3,894,281 | 7/1975 | Bloomfield | 362/473 X |
| 4,204,191 | 5/1980 | Daniels | 362/473 X |
| 4,546,354 | 10/1985 | Naito | 340/542 |
| 5,197,795 | 3/1993 | Mudrovich | 362/473 |
| 5,933,076 | 8/1999 | Babb | 362/473 X |

FOREIGN PATENT DOCUMENTS

| | | | |
|---|---|---|---|
| 1275595 | 10/1961 | France | 362/474 |
| 13344 | 6/1911 | United Kingdom | 362/474 |
| 2241775 | 9/1991 | United Kingdom . | |

OTHER PUBLICATIONS

Patent Abstracts of Japan; vol. 95, No. 008 & JP 07 208001, Aug. 1995.

Patent Abstracts of Japan; vol. 95, No. 009 & JP 07 232677, Sep. 1995.

*Primary Examiner*—Laura K. Tso
*Attorney, Agent, or Firm*—Bacon & Thomas PLLC

[57] ABSTRACT

A light signaling device (30) including a removable lighting device (32,34) and a security device (36, 44, 50) integral with the lighting device (32, 34) and lockable to a vehicle, such as a two-wheeled vehicle. The security device also serves to immobilize the vehicle. The lighting device may include a front signaling light source and a rear signaling light source housed in respective housings (32, 34). The security device includes a mechanical link (36) such as a wiring or steel strip between the housings, and a connecting device (42–70) for joining and locking the housings together.

18 Claims, 12 Drawing Sheets

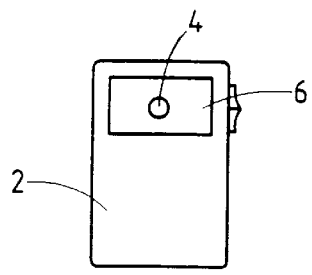
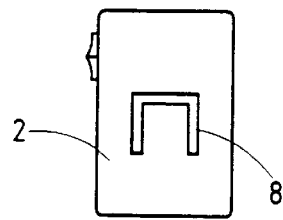
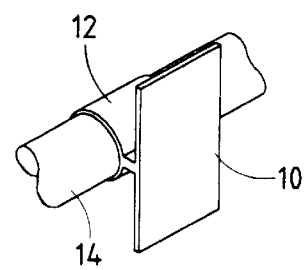
FIG.1
PRIOR ART
FIG.2
PRIOR ART
FIG.3
PRIOR ART
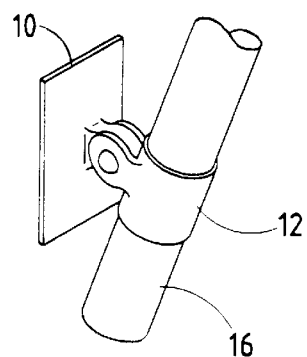
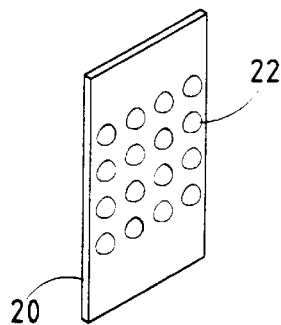
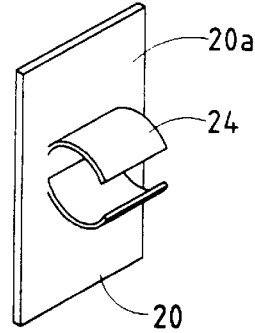
FIG.4
PRIOR ART
FIG.5
PRIOR ART
FIG.6
PRIOR ART

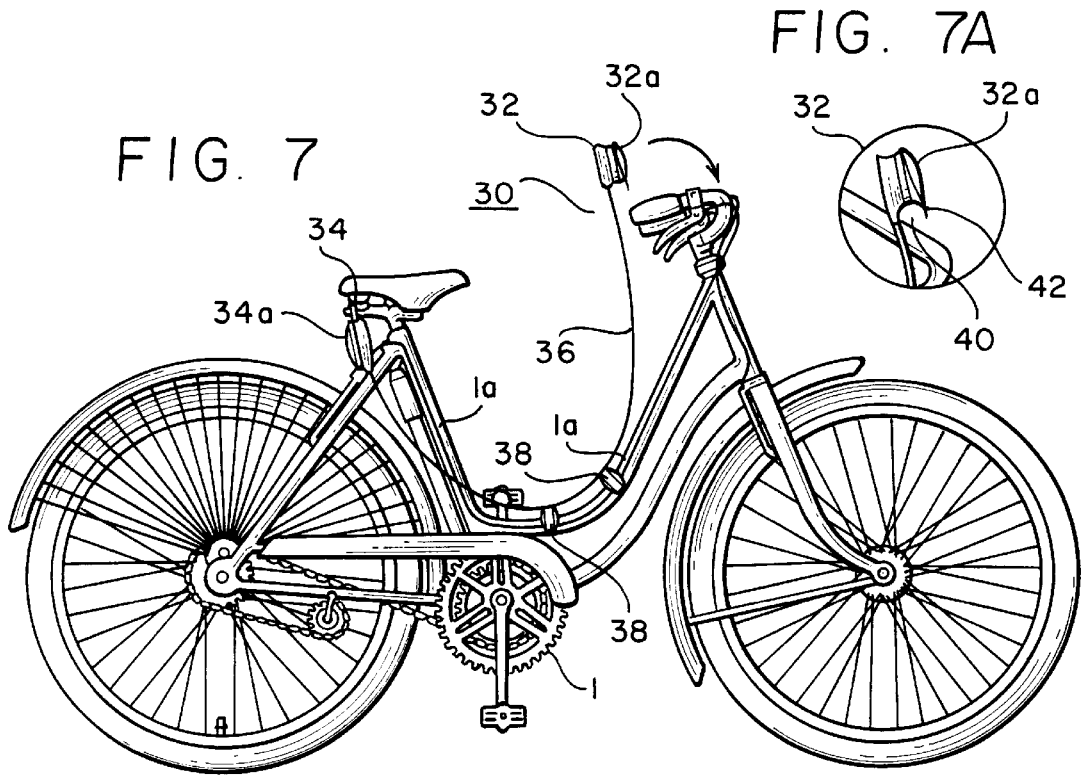
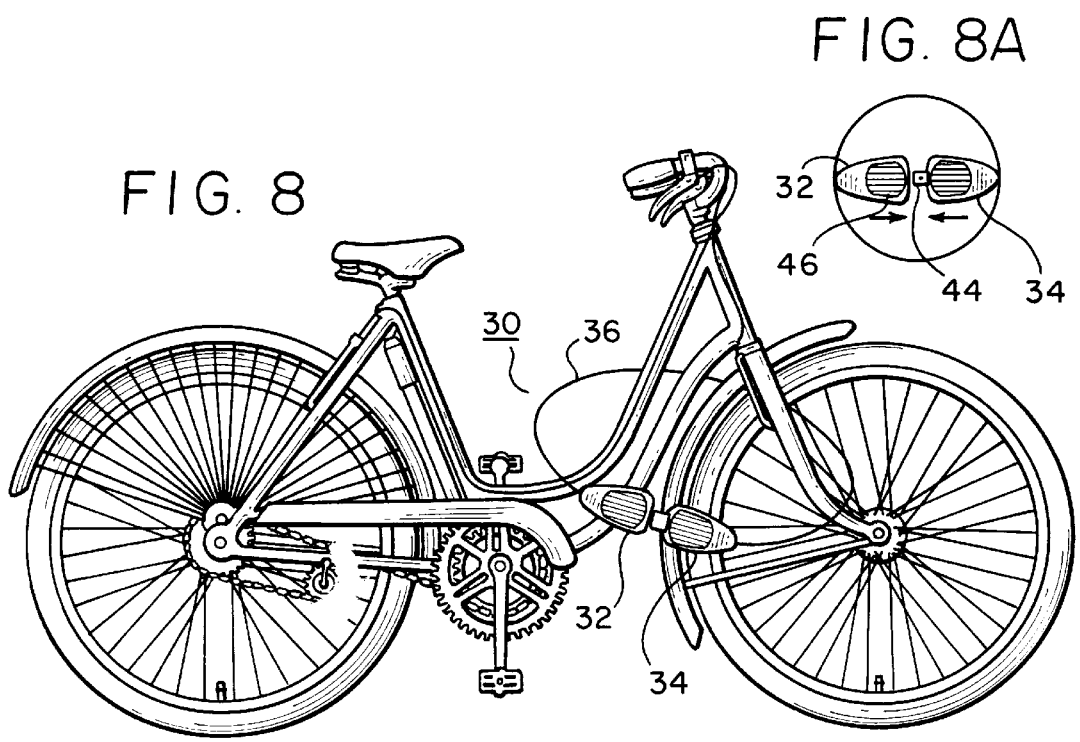

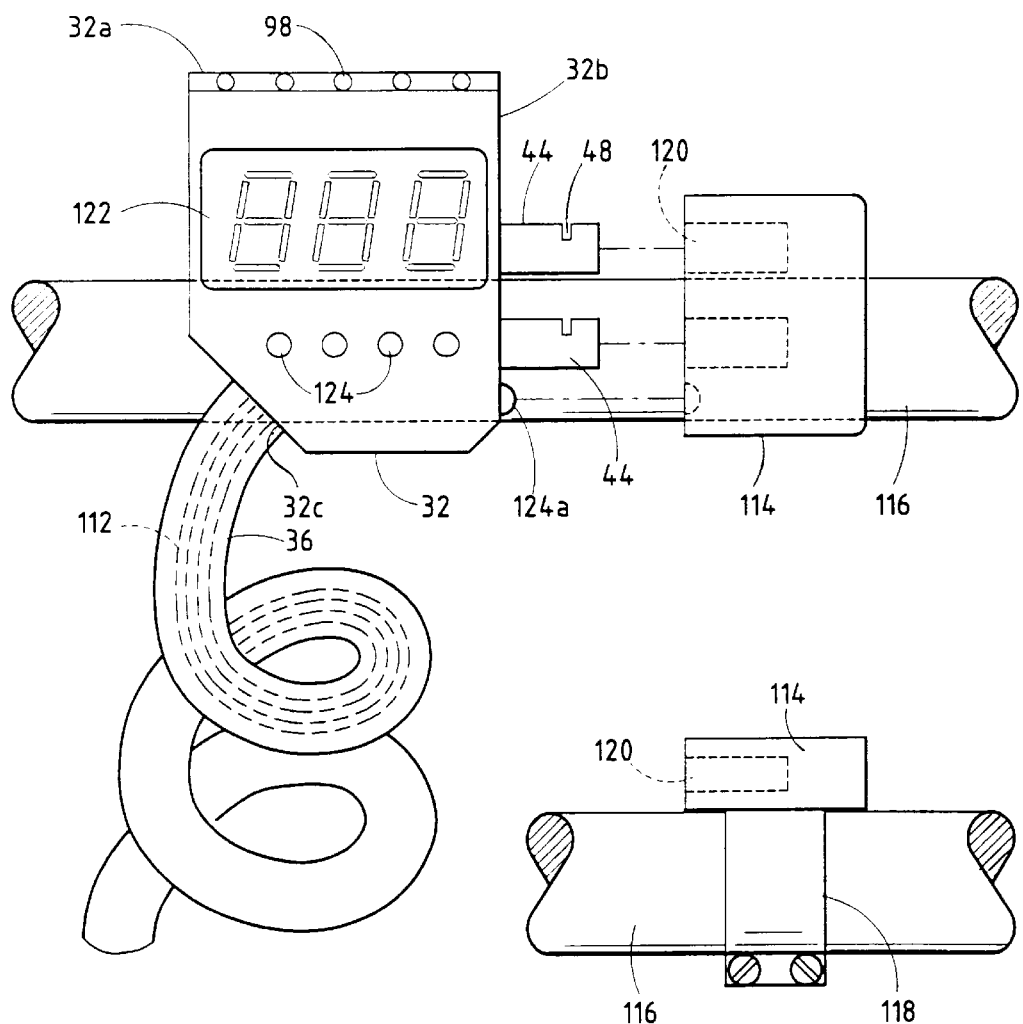

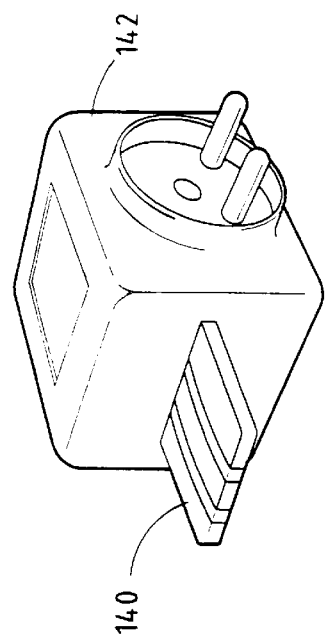
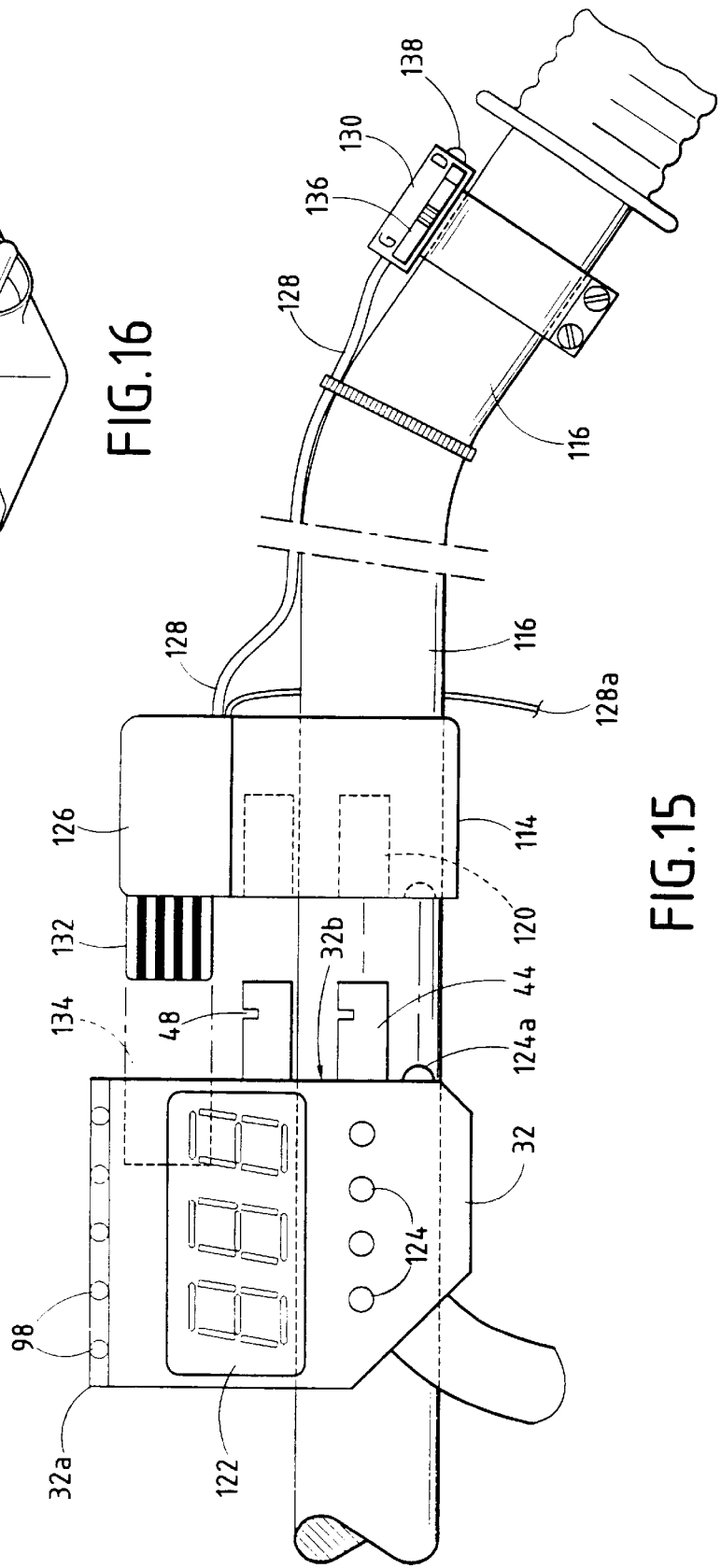
FIG.16
FIG.15

ILLUMINATING OR LIGHT SIGNALLING DEVICE, PARTICULARLY FOR BICYCLES AND THE LIKE

BACKGROUND OF THE INVENTION

1. Field of the Invention

The present invention relates to a lighting or light signaling device, in particular for two-wheeled vehicles, which device is intrinsically secure against theft.

2. Description of the Related Art

Lighting or signaling devices for fixing to a bicycle frame are well known in the prior art. Such devices can rapidly be mounted on any type of two-wheeled vehicle. They allow two-wheeled vehicles without an original lighting system, such as numerous mountain bikes or racing cycles, to be used at night or in urban surroundings, or any failure in the original lighting system to be overcome.

Such lighting or signaling devices are generally powered by a battery which may be rechargeable. It has the advantage over conventional lighting or signaling systems that are powered by a dynamo of remaining lit when the two-wheeled vehicle is stopped, and of providing a constant level of light whatever the forward speed of the two-wheeled vehicle.

A first embodiment of such a prior art removable lighting or signaling system is described below with reference to accompanying FIGS. 1 to 4. The lighting or signaling system is composed of a housing 2 shown in front view in FIG. 1 and in back view in FIG. 2. In a particular embodiment, housing 2 contains a battery, which battery may be rechargeable. It houses a bulb 4 located behind a window 6 which is clear or red in color depending on whether housing 2 is intended for mounting on the front or the back of the two-wheeled vehicle. A guide 8 is fixed to the back of the housing. Guide 8 is intended to engage on a bracket 10 carried by a ring 12 mounted on the handlebar 14 or the frame 16 of the two-wheeled vehicle.

FIG. 3 shows a ring-bracket assembly 12, 10 for mounting on the handlebar 14 of a bicycle, while FIG. 4 shows a ring-bracket assembly 12, 10 where the position of the bracket is pivotable, more particularly for mounting on the rear fork 16 of a bicycle. Guide 8 of housing 2 is forcibly inserted into bracket 10, so that the assembly can withstand vibrations produced when the bicycle is moving, while permitting the guide to be readily attached to and removed from the bracket.

FIGS. 5 and 6 show a second example of a prior art removable lighting or signaling device. It is constituted by a housing 20 carrying an array of light emitting diodes (LEDs) 22 on its front face, usually red or green verging on white, and which can blink in some embodiments. Housing 20 contains an LED control circuit and one or more batteries (not shown). A spring clip 24 is carried on the back face 20a for fixing housing 20 to the handlebar or frame of a bicycle.

The problem with such lighting or signaling devices is that they can easily be stolen if left on the two-wheeled vehicle. A user leaving a two-wheeled vehicle is thus constrained to carry the housings with him, which is an encumbrance due to the not insignificant size and weight of the housings.

SUMMARY OF THE INVENTION

The present invention aims to overcome the disadvantage of such prior art lighting or signaling devices by providing a light signaling or lighting device for a vehicle, in particular a two-wheeled vehicle, comprising security devices lockable to the vehicle, and integral with lighting or light signaling devices, characterized in that it comprises a front signaling light source and a rear signaling light source, the security device further providing an anti-theft function for said vehicle by including a mechanical link between said front and rear signaling light sources, and connecting device for joining and locking said signaling light sources together.

In particular, the invention can benefit from the flexibility of using removable lighting devices without the security problem which normally requires the lighting devices to be removed when the vehicle is not guarded. Further, the device of the invention also protects the vehicle by immobilizing it. Thus, remarkably, a single device fulfills the twin functions of protecting both the lighting means and the vehicle itself against theft.

The security device advantageously comprises an elongate element which can form a loop which is lockable around at least a portion of the vehicle.

The front and rear lighting or light signaling device are preferably housed in respective housings at each end of the mechanical link.

In a preferred embodiment of the invention, the lighting device comprise a front signaling light source and a rear signaling light source housed in respective housings, the security device comprising a mechanical link between said housings and connecting device for joining and locking the housings together.

This arrangement of two separate housings means that the front and rear lighting can be positioned in the most appropriate locations, for example on the handlebar and under the saddle or at a fixing point on a rear fork of a bicycle, while benefiting from a unitary structure due to the mechanical link. This link can be in the form of a spring steel strip or cable of a length which is sufficient to allow the housings to be placed in a lighting configuration, which means that it can easily be looped around the frame and one wheel of the vehicle, possibly also encircling a fixture such as a post or a fence.

The mechanical link is preferably in the form of a cable that is preformed, allowing it to adopt naturally a spiral configuration. This means that the cable can be pulled around the crossbar of a bicycle frame by passing the housing around the bar a number of times before positioning it.

In one embodiment of the invention, the front and rear housings each have one face provided with an exit window for the light source and two opposite ends, one integral with one end of the mechanical link and the other incorporating the means for joining the housings together.

In a further embodiment, for each of the two housings, the window for the signaling light source of one housing is protected by the other housing when the device is in its locked configuration.

The joining device preferably comprises at least one male element and a female element which are complementary, formed on the respective housings, the device further comprising brackets for fixing the respective housings on the vehicle enabling the housings to be fixed in the light signaling configuration by the male element and the female element.

In an advantageous embodiment of the invention, electrical wiring is associated with the mechanical link connecting the housings together. The wiring can be integrated into a protective sleeve of the mechanical link.

This arrangement means that a single energy source can be used which is housed in a first of the housings, preferably in the rear housing, power being supplied to the second housing via the electrical wiring.

Thus the second housing can be provided with means for connecting to an external source of electricity to enable the electrical energy source of the first housing to be recharged via the electrical wiring.

It is also possible to provide a turn indicator signaling device activated by a switch at the front of the vehicle and connected to the rear housing via the electrical wiring.

The switch may be wired to an interface device which is electrically connected to the front housing when the front housing is mounted in the light signaling position.

The front housing can also comprise a display device for determining and displaying information about the displacement of the vehicle.

In order to avoid any risk of unnecessary battery discharge, the device may also comprise a switch devices for inhibiting at least the light signaling when the device is in the locked configuration.

For increased security, the device may also comprise an intruder alarm which triggers in response to one or more of the following conditions: movement or force exerted on the device and breaking of the security device.

It is also possible to provide the device with a hooter and/or energy conversion device associated with the front or rear wheel or with the pedal bracket of the vehicle, to recharge the electrical energy source.

BRIEF DESCRIPTION OF THE DRAWINGS

Further characteristics and advantages of the invention become apparent from the description of a preferred embodiment, shown purely by way of example and made with reference to the accompanying drawings in which:

FIG. 1 is a front view of a prior art lighting housing;

FIG. 2 is a rear view of a prior art lighting housing;

FIG. 3 is a perspective view of a part which co-operates with the lighting housing of FIGS. 1 and 2 for mounting the housing on the handlebar of a two-wheeled vehicle;

FIG. 4 is a perspective view of a part co-operating with the lighting housing of FIGS. 1 and 2 for mounting the housing on the rear fork of a two-wheeled vehicle;

FIG. 5 is a perspective front view of another prior art lighting device;

FIG. 6 is a perspective view of the rear face of the lighting device of FIG. 5;

FIG. 7 is a view of a lighting device of a first embodiment of the invention in its lighting position on a two-wheeled vehicle;

FIG. 7A is an enlarged portion of FIG. 7 showing a detail of the front housing of a lighting device;

FIG. 8 is a view of a first embodiment of a lighting device in the anti-theft position on a two-wheeled vehicle;

FIG. 8A is an enlarged portion showing the joined front and rear housings of the lighting device;

FIG. 12 is a plan view of the front housing of a second embodiment of the device;

FIG. 13 is a side view of the bracket shown in FIG. 12;

FIG. 15 is a plan view of the front housing of a second embodiment of the device with an interface equipment;

FIG. 16 is a perspective view of an external power supply source for the front housing of a second embodiment of the device;

Figure 9:
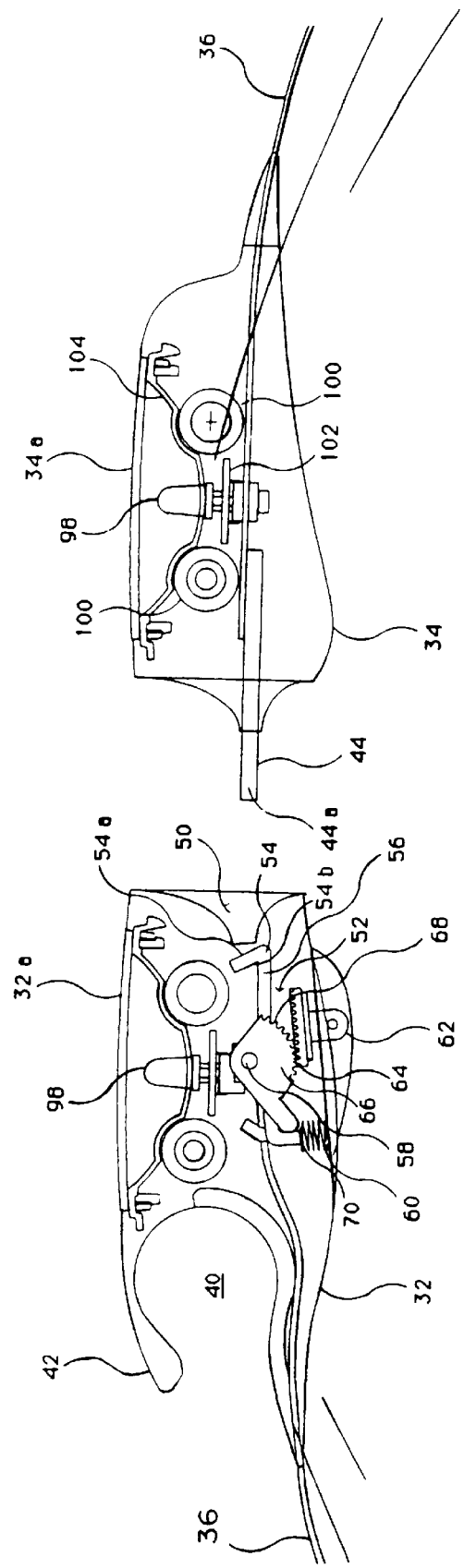
FIG. 9 is a cross section of the front and rear housings of a first embodiment of the lighting device.

A first embodiment of the invention is described with reference to FIGS. 7 to 11F.

DETAILED DESCRIPTION OF THE PREFERRED EMBODIMENTS

FIG. 7 is a general representation of a lighting and signaling device 30 of the invention, showed in its lighting position on a bicycle 1. The device comprises two housings 32, 34 incorporating a light source associated with optics (not shown) and an exit window 32a, 34a to carry out the front and rear signaling functions. Housings 32, 34 are connected via a spring steel strip 36 which resists shearing. The length of strip 36 is sufficient to enable front housing 32 to be positioned on the handlebar and rear housing 34 to be hooked under the bicycle saddle. In the embodiment shown in FIG. 7, the bicycle is a ladies' bicycle and strip 36 runs substantially in the vicinity of the V-shaped portion 1a of the frame, so as not to obstruct the user when getting on or off the bicycle. The lighting device co-operates with guide elements 38 fitted to the bicycle frame to guide the strip 36 to prevent any displacement thereof from obstructing the cyclist. Such a guide element can, for example, take the form of a set of open rings, one fitted on the frame and the other receiving strip 36.

Front housing 32 has a concave surface forming a groove 40 (FIG. 7A) having at its opening a resilient element 42 for retaining the handlebar in its groove. The weight of the mechanical link acts on the front housing to hold the groove in abutment against the handlebar portion.

Rear housing 34 is fixed beneath the saddle by device of a hook at the housing which co-operates with a lug depending from the saddle frame.

The device is thus held on the vehicle—in this instance a bicycle—in readily removable fashion when it is in its light signaling configuration.

As shown in FIG. 8, when the lighting device is in its security configuration, front and rear housings 32, 34 are secured to each other by male 44 and female 46 locking devices integral with the front and rear housings respectively (FIG. 8A). Strip 36 thus forms a loop which is long enough to surround bicycle 1, for example the front wheel and a portion of the frame, and possibly a fixed attachment point, for example a post or a fence.

In the example, strip 36 is made of spring steel with a width of about 12 millimeters (mm) and a thickness of about 2 mm. It is covered with a smoothing layer which protects the metal and rounds its edges. The smoothing layer is preferably fluorescent, either completely, or in patterns.

Figure 10:
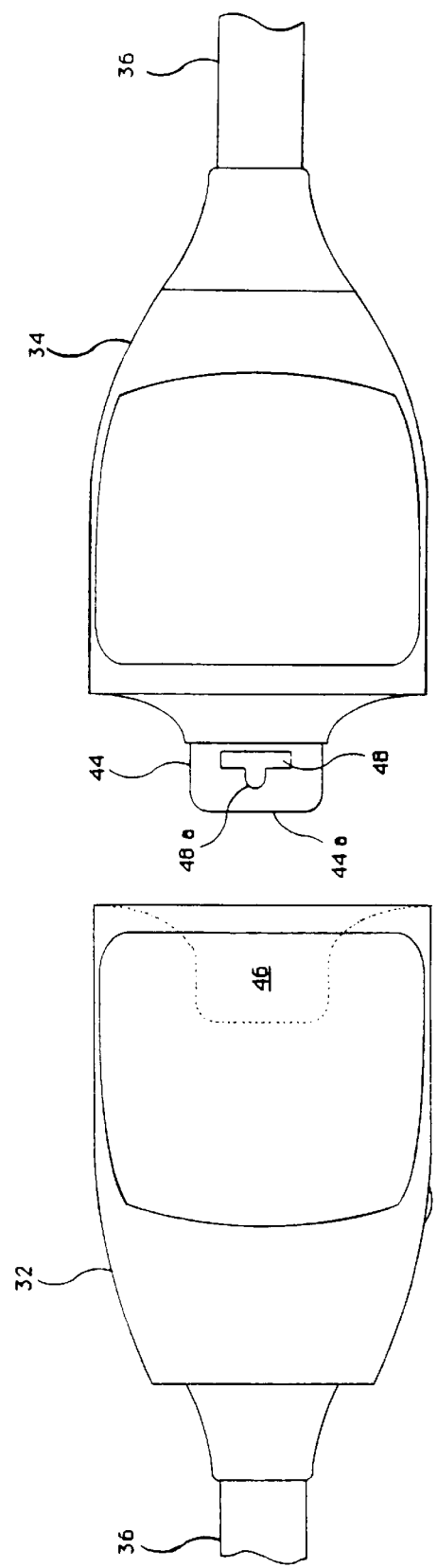
FIG. 10 is a simplified plan view of the front housing of the first embodiment.

FIGS. 9 and 10 show details of the joining device of housings 32, 34.

The male locking element comprises a tongue 44 containing a cut-out or opening 48 with cut-out 48a (shown in the front view of the housings, FIG. 10) which projects from rear housing 34 from its end opposite from its end from which strip 36 projects.

The female locking element comprises an opening 50 for receiving and guiding tongue 44, and latching elements 52 to retain the tongue.

Latching elements 52 comprise a hook 54 pivotally mounted inside opening 50, which co-operates with the cut-out 48 in tongue 44. Hook 54 is formed at the end of an element 56 articulated about a pivotal axis 58. This articulated element 54 is biased by a spring 60 such that hook 54 is normally held in a latching position. Viewed from opening 50, hook 54 has an outer surface 54a which is inclined so as to pivot against the effect of spring 60 when the anterior edge 44a of the tongue comes into contact with it when engaging housings 32, 34. Hook 54 thus slides along the face of tongue 44 and lifts under the action of spring 60 when it reaches cut-out 48. Blade 44 is thus held in abutment against the inner surface 54b of hook 54 by the front edge of the opening (FIG. 10).

A manual release mechanism for the latching devices is constituted by a slide 62 which has one face accessible from the outside of front housing 32 to enable hook 54 to be pivoted against the bias direction of spring 60. Slide 62 comprises two parallel racks 64 (only one is shown in FIG. 9) which co-operate with a part 66 comprising a pair of serrated segments 68 mounted on the same axis 58 as articulated element 56. A rod 70, depending from part 66, bears against a portion of the surface of the articulated element at the end opposite to that of hook 54. Translational displacement of slide 62 displaces rod 70 against articulated element 56 via rack 64 to pivot element 56 and withdraw hook 56 from opening 48 in tongue 44.

It can be seen that the opening in the tongue can be used to hook the housing on the bicycle in the lighting configuration, for example using a lug depending from the saddle or from a rear fork of the frame.

The locking mechanism is described with reference to FIGS. 11A to 11F.

Locking is effected by using a combination lock to prevent slide 62 from moving in translation. This is shown in exploded view in FIG. 11A, in a section on line B–B' of FIG. 11A in FIG. 11B, and in a section on line C–C' of FIG. 11A in FIG. 11C.

Figure 11A:
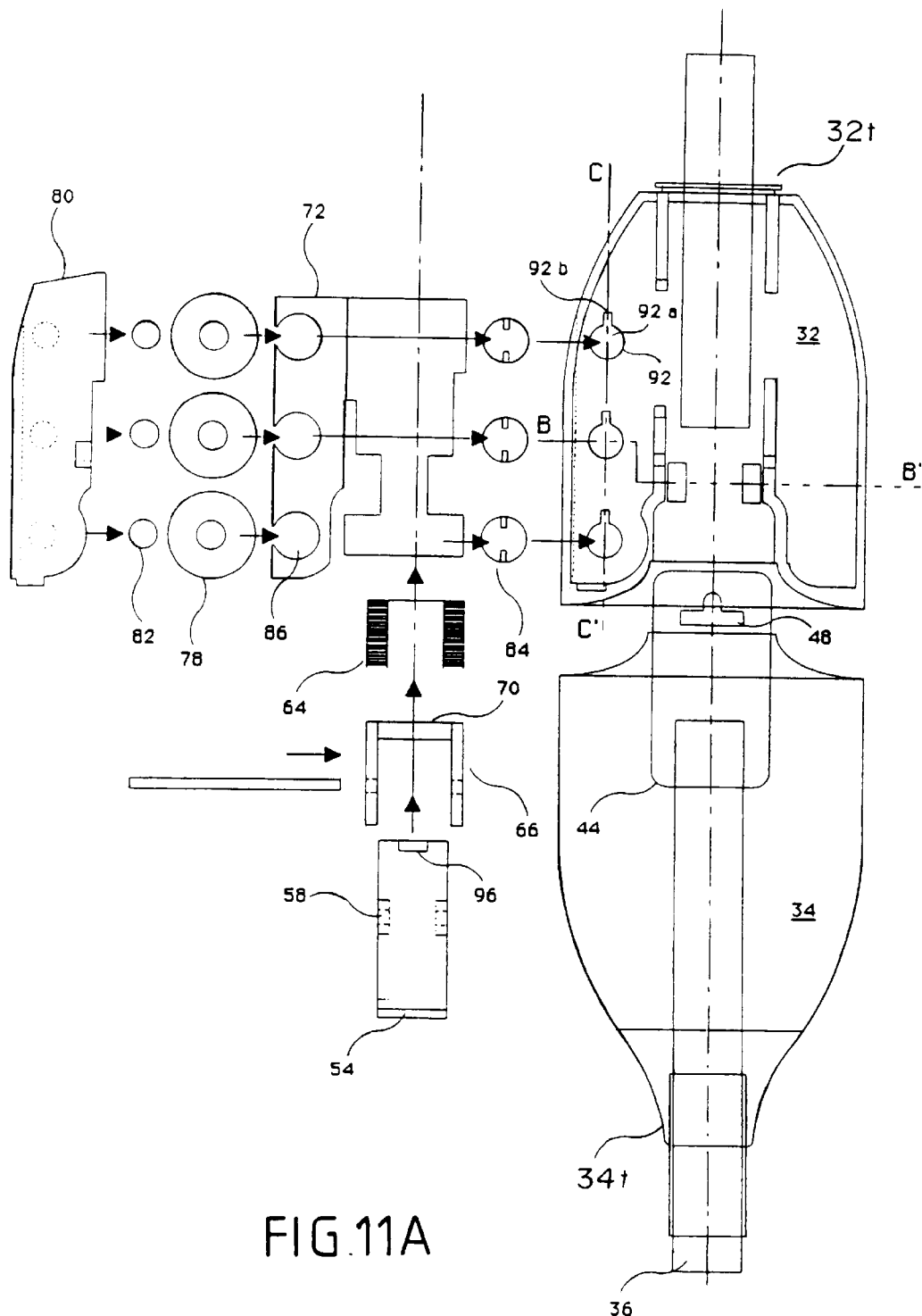
FIG. 11A is an exploded view of the face of the front housing of the lighting device of the first embodiment.
Figure 11B:
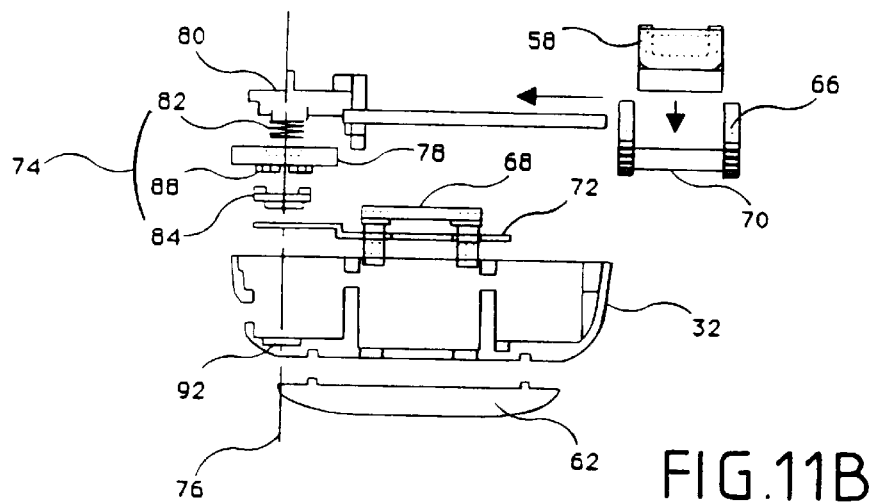
FIG. 11B is an exploded view along the axis B–B' of FIG. 11A of the front housing of the lighting device of the first embodiment.
Figure 11C:
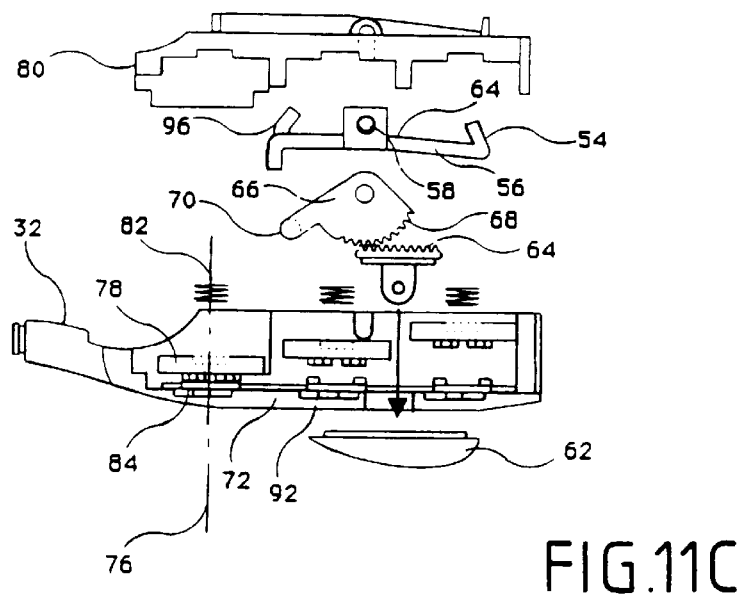
FIG. 11C is an exploded view along axis C–C' of FIG. 11A of the front housing of the lighting device of the first embodiment.
Figures 11D, 11E, 11F:
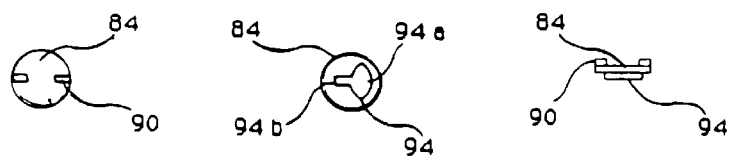
FIG. 11D is a detailed view of a profiled part forming part of the locking means of the embodiment of the invention, shown in plan view at a first face.
FIG. 11E is a detailed view of the profiled part of FIG. 11D showing a second face thereof, opposite the first.
FIG. 11F is a detailed view of the profiled part of FIG. 11D, viewed in profile.

The lock comprises a profiled sliding plate 72, integral with slide 62, and a set of three wheel devices 74 which pass through the sliding plate (FIG. 11B). Each wheel device 74 is formed from two portions mounted on a common rotational axis 76. One portion comprises a wheel 78, on a housing 86, which accesses the combinations, retained on a bearing 80 depending from front housing 32 via a pretensioned spring 82. The other portion comprises a profiled part 84 retained in sliding plate 72 and passing through it. The profiled part 84 is shown in detail in FIGS. 11D to 11F, from the two opposite faces and from the side.

The facing faces of wheel 78 and profiled part 84 (shown in FIG. 11D) respectively have housings 88 and complementary raised portions 90 to secure the wheel and profiled part mutually under the action of pretensioned spring 82.

The face of the profiled part which is turned towards the bottom of front housing 32 in different angular positions of wheel 78, corresponding to the possible settings of the combination, is housed in a hollow 92 in the housing which acts as a bearing. Hollow 92 has a circular portion 92a to hold and guide profiled part 84 and a contiguous channel 92b (FIG. 11A). Channel 92b is aligned along the translational axis of sliding part 72 (arrow F, FIG. 11A).

Face 84a of the profiled part which is turned towards the bottom of housing 32 has a raised portion 94 comprising a portion 94a with a rounded shape to guide the part into the hollow and a contiguous portion of elongate shape 94b which can be received in channel 92b substantially without play.

When wheel 78 and profiled part 84 are engaged, rotating the wheel can align the raised portion of elongate shape 94b with channel 92b.

When this configuration is achieved with all three wheel devices 74, sliding plate 72 can be moved in translation along housing 32, the raised portions with elongated form 94b thus being introduced into respective channels 92b. The amplitude of this movement, defined by channels 92b, is sufficient to allow articulated element 64 to pivot and thus disengage hook 54 from opening 48 in tongue 44.

In contrast, if the elongated raised portions 94b are not aligned with their respective channels 92b for all three wheel devices 74, sliding part 72 is prevented from moving in translation since the end of at least one elongated raised portion abuts against the wall portions delimiting hollow 92 of housing bottom 32.

The combination for the wheel devices 74 which enables the two housings 32, 34 to be separated can be identified by visible marks on the circumference of the wheel (not shown). This combination can be mechanically programmed by setting the existing combination and holding slide 62 displaced into a position disengaged from hook 54. In this configuration, the respective axes of wheel 78 and profiled part 84 are offset. For each wheel device 74, it then suffices to turn wheel 78 freely to a selected mark and to replace slide 62 in its normal joining position. To this end, the interface between wheel 78 and profiled part 84 comprises complementary serrations indexed to the marks.

The ends of strip 36 penetrate into housings 32t, 34 at terminals 32', 34'. Each of the two terminals 32t. 34t is situated opposite an edge having the joining means defined above.

The end of strip 36 attached to front housing 32 is sealed to articulated element 64. In the example shown in the drawing, the strip is fixed to the retaining end of this element 64 which is opposite to that forming the latching hook 54. A hook 96 which is integral with the retaining end passes through an opening provided in strip 36 and retains it permanently. Strip 36 is also kept tightly gripped at terminal 32t of the front housing. This terminal 32t is located downstream from the bottom of groove 40 forming the device for fixing housing 32 to the handlebar (FIG. 9). In this way, the weight of strip 36 hanging from this exit edge, terminal 32t creates stable equilibrium to hold housing 32 in place on the handlebar.

The end of strip 36 attached to rear housing 34 can be fixed to tongue 44 by brazing. It can also be riveted thereto, or fixed in another fashion to any solid point of the housing.

A conventional lighting system comprising a light source 98, a set of batteries 100, an electrical circuit 102, a reflector 104 and a rear reflector window 32a or 34a is integrated into each of the front and rear housings 32, 34.

As an example, the light source is constituted by one or more light emitting diodes (LEDs) 98 mounted directly in circuit 102, which is the form of a small card. Card 102 comprises a bracket for batteries 100, and electronic control circuits to regulate the light intensity and blinking configurations of LEDs 98. The stop/go control and the above adjustments are accessible via buttons on the back of the housing (not shown).

Optical portions 32a or 34a, 104 and the light source 98 are selected to produce a beam (white for the front, red for the back) which satisfies current standards and legislation.

A good compromise between security, lightweight and cost price of the device can be achieved by producing the housings in the form of moulded plastics material shells. For increased security, it is also possible to use carbon composites, alloy parts, or even high strength steel.

A second and third embodiment of the invention are described with reference to FIGS. 12 to 19 and 20 to 23 respectively. To make them easier to understand, elements of these embodiments with functions analogous to those described in the first embodiment carry the same reference numerals as shown in those figures.

In the second embodiment, each of the front and rear housings 32 and 34 (respectively illustrated in FIGS. 12 and 14) comprises a joining device 44, 50 on one side or lateral edge 32b, 34b which is perpendicular to the window 32a, 34a for their signaling light source 98. In the example, the front housing joining devices comprises two parallel pins 44 comprising notches 48. The rear housing joining devices 34 comprises two holes 50 intended to house pins 44. Rear housing 34 incorporates a key-operated lock 110 (shown as dotted lines) to lock pins 44 in the security configuration of the device.

One corner 32c, 34c of each housing receives a respective end of a cable 36 constituting the mechanical link. As shown in FIG. 12, cable 36 is preformed so as to adopt a spiral configuration naturally. This means that cable 36 can be wound around the crossbar of a bicycle frame 1 by passing the front housing 32 a number of times around the bar before positioning it on bracket 114.

Cable 36 includes electrical wiring 112 connecting the two housings 32, 34. Electrical wiring 112 transports electricity from one housing to the other, enabling an electrical energy source to be provided in only one of the housings (rear housing 34, for example). The wiring 112 further comprises control wires which enable the device to be provided with additional functions, as explained below.

The electrical wiring is advantageously integrated in the mechanical link, for example under a protective layer or sleeve thereof.

In its light signaling position, front housing 32 is engaged on a bracket 114 which is mounted on handlebar 116 via a fixing ring 118 (FIG. 13). Bracket 114 has two holes 120 which can receive pins 44 and hold them securely via snapfastening means (not shown).

Front housing 32 also comprises a display screen 122 to display various parameters of the device, such as signaling mode and the condition of the electrical energy source. In the example, front housing 32 also incorporates a control device (not shown) to determine information regarding the displacement of the bicycle, such as the distance covered, speed, etc., also the time and temperature, and to show them on the display device 122.

Front housing 32 also comprises buttons 124 to activate the various controls relating to the functions of the control device and to switch on the front and rear light sources 98, via electrical wiring 112.

Front housing 32 also comprises a main switch in the form of a push button 124a which inhibits operation of the front and rear light sources 98 and the other functions mentioned above, when it is in the depressed position. Button 124a is positioned so as to be depressed when front and rear housings 32 and 34 are joined together, thus avoiding energy wastage if control buttons 24 are activated. When front housing 32 is on its bracket 114, a depression in the bracket keeps button 124a inactive.

FIG. 15 shows an assembly comprising front housing 32 and bracket 114 to which an interface device 126 has been added. The interface device 126 is removably fixed to bracket 114, electrical connection being provided via wire 128 between front housing 32 and a switch block 130 located near one of the grips of handlebar 116. Interface 126 is provided with a plug with a plurality of conductive elements 132 which are connected to a socket 134 (shown in dotted lines) on the lateral edge 32b of the front housing when it is fixed to bracket 114. Interface 126 relays commands from the switch block 130 to the rear housing via electrical wiring 112.

It can be seen that the front housing 32 is positioned on its bracket 114 and that the socket 134 and plug 132 of the interface are interconnected in a single movement, which improves ergonomics.

Switch block 130 has a blinker control 136 to signal an intention to change direction, and a button 138 to activate a hooter or horn device.

In this embodiment, display 126 is also wired (wire 128a) to a dynamo (not shown) to recharge the battery. It can be seen that the battery can also be connected to any type of electrical energy generator associated with the motion of the front or rear wheel, or the pedal bracket, by electrical connection to one or other of the housings.

A device for recharging the battery based on solar collectors can also be envisaged.

In this embodiment, front housing 32 does not include an internal energy source. It is powered via electrical wiring 112 from an energy source such as a rechargeable battery housed in rear housing 34. This arrangement releases some of the volume in front housing 32 so that it can house control and display means 122 while still ensuring that its dimensions are small enough to allow front housing 32 to be passed between the spokes of a bicycle wheel when placing it in the locking configuration.

Front housing socket 134 is also able to receive an output plug 140 of an external power supply 142 to recharge the battery in the rear housing 34 via electrical wiring 112 (FIG.

16). This arrangement advantageously uses the link between the two housings as extension wiring, and thus rear housing 34 can be left in position on the bicycle when recharging the battery. It can also enable a fixed or not readily accessible battery to be used in the rear housing 34 and thus offers better protection against theft of the battery.

Figure 14:
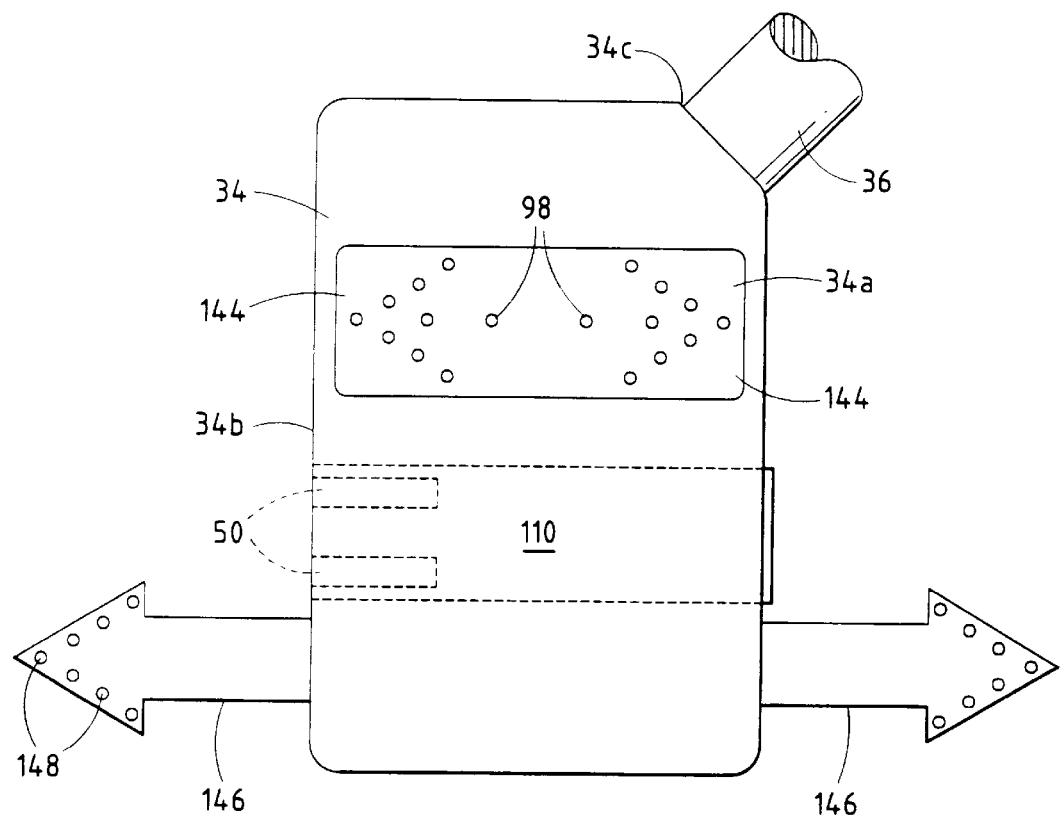
FIG. 14 is a front view of the rear housing of a second embodiment.

As shown in FIG. 14, the light sources of the rear housing 34 are constituted by a pattern of light emitting diodes 98 behind window 34a. This pattern can produce a blinking light pattern in the form of arrows 144 directed to the left or to the right under the control of commands received from the switch device 138 via wiring 112.

In the example, rear housing 34 also includes overtaking arrows 146 pointing respectively towards the right and the left and comprising light emitting diodes 148 to indicate changes in direction under the control of commands received from switch device 138. These light emitting diodes 148 can be orange in color, as is more appropriate for this function.

Figure 17:
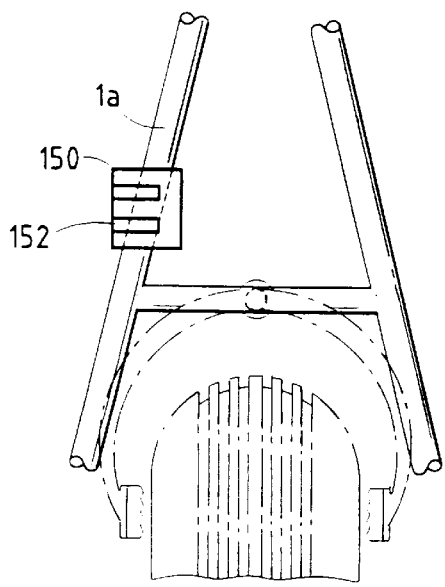
FIG. 17 is a simplified view of a fixing bracket for the rear housing of a second embodiment of the device.
Figure 18:
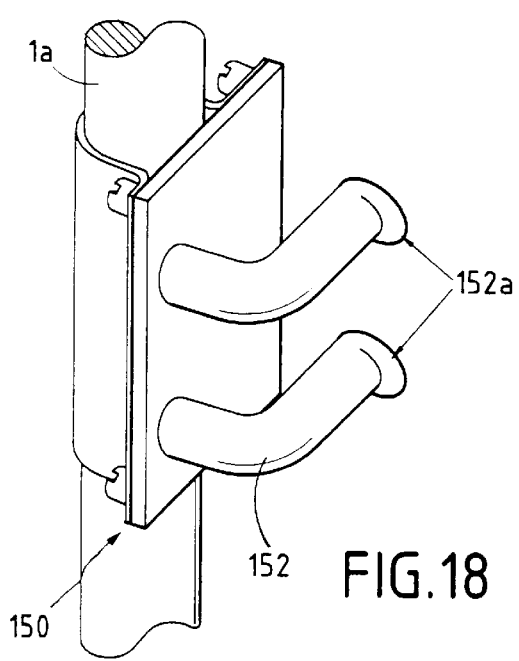
FIG. 18 is a perspective view of the fixing bracket of FIG. 17.

Rear housing 34 is fixed to bracket 150 mounted on one of the rear forks 1a of bicycle 1, as shown in FIGS. 17 and 18. Bracket 150 comprises a pair of pins 152, provided with clamping elements 152a, in a configuration which is substantially identical to pins 44 of front housing 32, and intended to be housed in holes 50 in rear housing 34.

An intruder detection device associated with an audible or visible alarm (for example using light emitting diodes 98) can be incorporated into one or other of the housings. Such device can be produced using any known techniques so as to be triggered in response to a movement or a force exerted on the housings, or to the electrical wiring 112 being cut. This alarm can utilize a strain gauge mounted in one of the housings to detect a force in excess of a predetermined threshold being exerted on the locking device. The audible alarm can be produced by the hooter, but controlled so as to emit a more powerful and piercing sound.

The intruder alarm device is placed on watch when push button 124a of the front housing is in its depressed position, when the two housings are locked together.

It is possible to provide the intruder detection device with a remote control, operating for example by a high frequency or infrared link.

Figure 19:
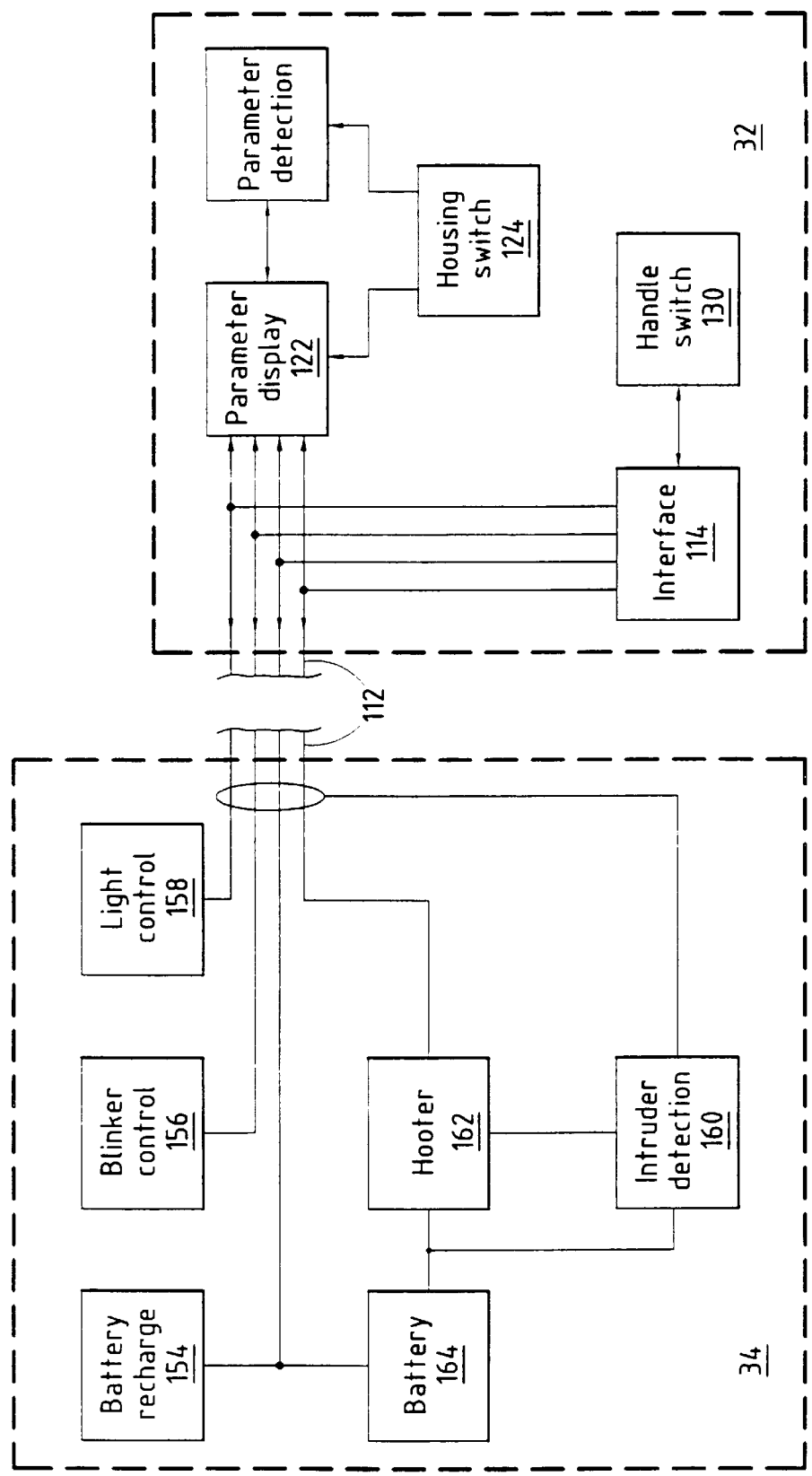
FIG. 19 is a block diagram showing the electrical and electronic functions of a second embodiment of the device.

FIG. 19 is a block diagram showing the organization of the electrical and electronic elements of the apparatus of the second embodiment.

Rear housing 34 comprises a battery recharge 154, a battery charge monitoring and control circuit 164, a blinker control circuit 156, and a circuit 158 controlling the front and rear signaling diodes 98 (lights), all functionally connected via electrical wiring 112 to switch buttons 124 of front housing 32 and/or its interface 114.

An intruder detection device 160 and the audible alarm 162 are directly connected to battery 164 so as to remain operative even when wiring 112 is cut.

In order to limit the number of wires constituting the electrical wiring, it is possible to envisage connecting the mechanical link constituted by cable 36 to the terminal of the energy source which constitutes the common terminal of the assembly of the device's circuits. Similarly, it is also possible to connect this common terminal to the bicycle frame to enable electrical connections to be made to the common terminal directly from the bicycle frame.

A third embodiment of the signaling device of the invention is described below.

In this embodiment, the front light signaling housing 32 incorporates the same functions described for the second embodiment and in the interests of conciseness, these are not described again.

Figure 20:
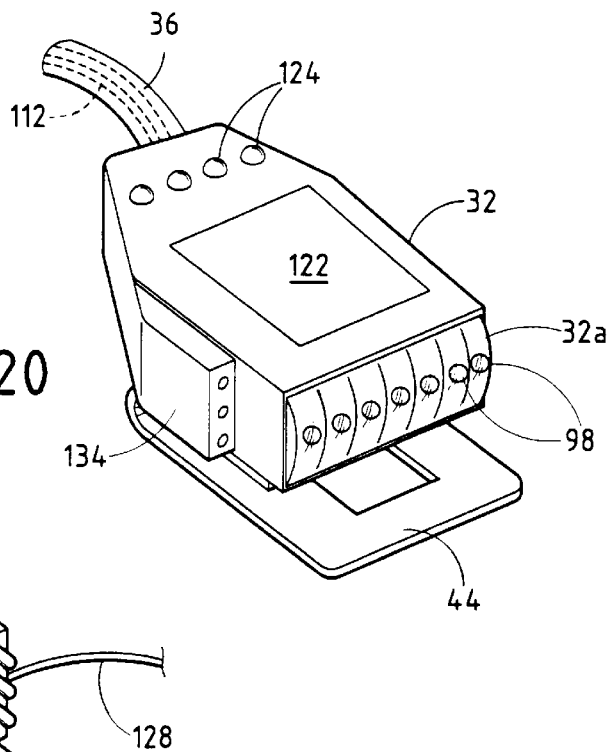
FIG. 20 is a perspective view of the front housing of a third embodiment of the device.
Figure 21:
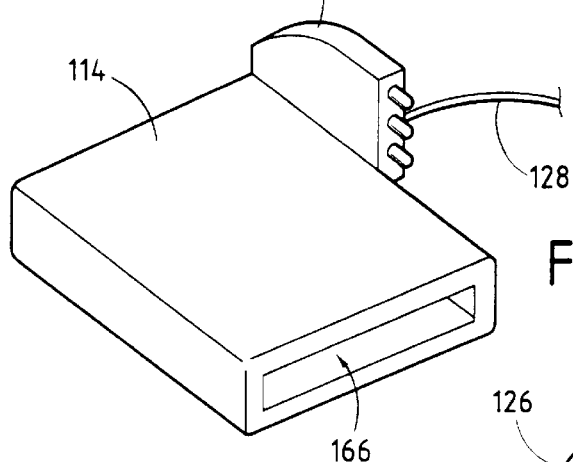
FIG. 21 is a perspective view of a bracket with an electrical interface, adapted to receive the front housing of FIG. 20.
Figure 22:
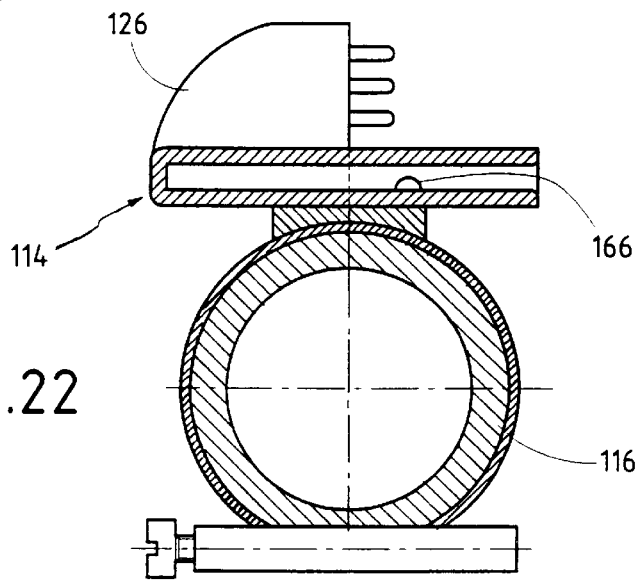
FIG. 22 is a simplified cross section view of the bracket of FIG. 21.

FIG. 20 shows the joining device on front housing 32 comprising a tongue 44 which extends beneath the lower plane of housing 32 and extends slightly beyond the anterior edge of the latter. This tongue 44 can also be used to mount front housing 32 on bracket 114 on handlebar 116 (FIGS. 21 and 22). In this case, tongue 44 engages in a slot 166 provided in bracket 114 in the front-rear axis direction of bicycle 1.

Wiring 36 forming the mechanical link between housings 32 and 34 can be directly secured to tongue 44 for increased security. Wiring 36 and electrical wiring 112 enter front housing 32 by its rear face, at a slightly oblique angle.

An electrical interface 126, equivalent to that described for the second embodiment, is provided on one side of bracket 114 to make contact with a complementary connector 134 on front housing 32 when the latter is fitted in bracket 114. Interface 126 is connected to a switch device to control the blinkers and hooter (not shown), identical to that described for the second embodiment. Connector 134 can also be connected to a source of electricity from an external power supply to recharge the battery contained in the rear housing 34.

Figure 23:
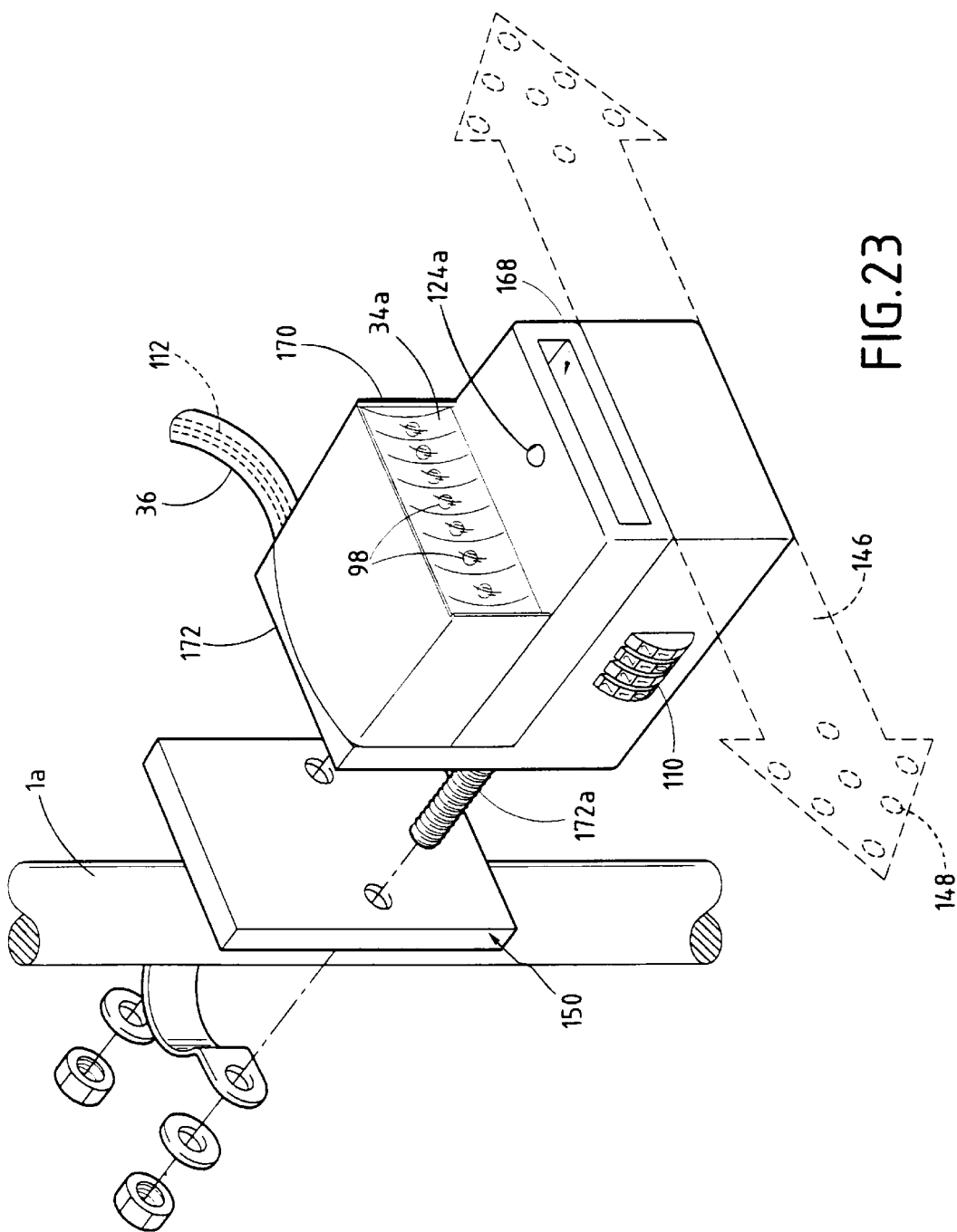
FIG. 23 is a perspective view of the rear housing of a third embodiment of the device and a fixing bracket therefor.

As shown in FIG. 23, the rear light signaling housing has a slot 168 forming a joining and locking device under its window 34a adapted to receive tongue 44 of the front housing, in analogous fashion to the device of the first embodiment. In the example, locking is effected by latching using a combination lock 110.

It can be seen that in this embodiment, windows 32a, 34a for the front and rear housings are face to face when the apparatus is in its locked configuration. In this way, these elements, which may constitute a weak point of the device, are protected. Abutments or pads 170 can be provided around one of windows 34a to prevent them from colliding when putting it into the locked configuration.

The portion of rear housing 34 below slot 166 comprises lock 110 and the battery (not shown). Blinker arrows 146, 148 are also fixed to this portion, as in the second embodiment.

The back of the housing has a plate 172 on which a device 172a for fixing to a bracket 150 attached to one of the rear forks of the bicycle are provided.

Given that it is only necessary for one of the housings (in the example, the front housing) to be capable of passing between the spokes of a wheel (normally the rear wheel) to protect it, the rear housing can be held on its bracket when the device is in its locked position. The rear housing 34 and bracket 150 can thus be connected without any need for a rapid detachment device, for example using a screw. In this third embodiment, push button 124a for inhibiting the function of the device is located on rear housing 34 and is placed on a surface which comes into contact with the front housing when the device is in its locking configuration.

A large number of variations of the device can be envisaged without departing from the scope of the invention. These variations may concern the nature of the materials constituting the mechanical link (wiring, strip, chain, carbon fiber braid . . . ), the size of this link, the locking system (key, combination lock, electronic, electromagnetic . . . ), the lighting or light signaling device (bulbs, diodes . . . ) or the device for fixing the housings to the two-wheeled vehicle (resilient ring with or without bracket, a device using "Velcro" strips or straps, hook systems . . . ).

In particular, it should be noted that the invention enables a wide variety of joining device to be used, which can be based either on latching systems, or on simple male-female type links, or other gripping devices.

The locking function can thus be achieved using all types of key-activated cylinders. As an example, in the case of the first embodiment, the cylinder is arranged so as to be able to block translation movement of the sliding plate.

In other variations of the invention which can be envisaged, the device may comprise a single housing carrying out only front or rear signaling. This housing can be secured to a mechanical link incorporating locking means which can protect both the vehicle and the light source. The housing can also be provided with two windows on opposite faces, respectively associated with front and rear signaling light sources.

In a further embodiment, the rear housing of the example described may comprise only passive signaling means, i.e., a reflector alone.

In considering the variations, the skilled person will, of course, consider current standards and legislation regarding lighting of vehicles such as two-wheeled vehicle.

Finally, it should be noted that the disclosure regarding one embodiment can be transposed to another, both as regards mechanical means and as regards the functions offered.

As an example, the front and rear housings of the second and third embodiments can each be provided with a respective energy source. In this variation the electrical wiring can, in addition to providing control links, serve to interconnect the energy sources to better balance the loads and provide greater reliability.

In a still further variation of the invention, the electrical energy source is housed in a housing which is separate from the front and rear housings comprising the light signaling means. As an example, this housing can be attached to the mechanical link and connected to the front and rear housings by means of the electrical wiring. For better stability, the housing containing the electrical energy source can be associated with a support means fixed to the frame. It may have a configuration and a support analogous to those conventionally used to transport one or more water bottles.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A lighting device (30) configured for fitting on a vehicle (1), comprising: a security device (36, 44–96; 110) lockable to the vehicle, the security device (36, 44–96; 110) integral with a light signaling device (32, 34), including a front signaling light source and a rear signaling light source, said security device (36, 44–96: 110) further including an anti-theft device comprising a mechanical link (36) between said front and rear signaling light sources and a connecting device (42–70) joining and locking said signaling light sources together.

2. The lighting device according to claim 1, wherein the security device (36, 44–96; 110) includes an elongate flexible element (36) bendable into a loop which is lockable around at least a portion of the vehicle.

3. The lighting device according to claim 1, wherein the light signaling device (32, 34) includes front and rear housings that are housed at respective ends of the mechanical link (36).

4. The lighting device according to claim 1, wherein the mechanical link (36) is in the form of a wiring which is pre-formed so as to adopt a spiral configuration naturally.

5. The lighting device according to claim 3, wherein each of the front and rear housings of the light signaling device (32, 34) has a face provided with a display window (32a, 34a) arrranged to show one of the signaling light sources and the front and rear housings including first and second terminal ends(32t, 34t), the first terminal end integral with one end of the mechanical link (36) and the second terminal end incorporating the connecting device (42–70) configured for joining the housings together.

6. The lighting device according to claim 3, wherein in each of the two housings of the light signaling device (32, 34) includes a display window (32a or 34a) and the display window of one of the housings is protected by the other housing when the lighting device is in a locked configuration.

7. The lighting device according to claim 1, wherein the connecting device (42–70) includes at least one male element (44) and at least one female element (46) that are complementary and the lighting device further comprises brackets configured for fixing the respective light signaling device (32, 34) to the vehicle to fix the latter in a light signaling configuration respectively by the male and female elements (44, 46).

8. The lighting device according to claim 1, further comprising an electrical wiring (112) configured along a length of the mechanical link (36), the light signaling device further including front and rear housings, the electrical wiring connecting the front and rear housings of the light signaling device (32,34) together.

9. The lighting device according to claim 8, further comprising a single energy source housed in a first one of the front and rear housings of the light signaling device and a power supply to a second one of the front and rear housings of the light signaling device being provided via an electrical wiring (112).

10. The lighting device according to claim 9, wherein the second one of the front and rear housings of the light signaling device includes a socket (134) configured to link to an external electrical current source (142) thereby enabling the energy source of the first one of the front and rear housings of the light signaling device to be recharged via the electrical wiring (112).

11. The lighting device according to claim 8, further comprising a turn indicator signaling device (144, 146) activated by a switch (136) at the front of the vehicle, and connected to either one of the front and rear housings of the light signaling device via the electrical wiring (112).

12. The lighting device according to claim 11, wherein said switch (136) is wired to an interface device (126, 132) which electrically connects with one of the front and rear housings of the light signaling device when the latter is mounted in a light signaling position.

13. The lighting device according to claim 3, wherein the front housing (32) includes a display device (122) that displays information concerning displacement of the vehicle (1).

14. The lighting device according to claim 1, further comprising a switch device (124a) configured for inhibiting light signaling when the lighting device is in a locked configuration.

15. The lighting device according to claim 1, further comprising an intruder alarm (160, 162) configured to be triggered by a response selected from the group consisting of movement of the lighting device, force exerted on the device and breaking of the security device (36, 44–96; 114).

16. The lighting device according to claim 1, further comprising a horn (162).

17. The lighting device according to claim 9, further comprising an energy conversion device connected to a rotating component of the vehicle and including a device for recharging the energy source.

18. The lighting device according to claim 1, wherein the lighting device forms an assembly which is detachable from the vehicle.

* * * * *